United States Patent Office 3,728,338
Patented Apr. 17, 1973

3,728,338
6-ALKYL - 3 - HYDROCARBONACEOUS-16α,17α-DIHYDROXYPREGNA - 3,5 - DIEN - 20-ONE CYCLIC 16,17-ACETALS AND CONGENERS
Charles S. Markos, Deerfield, Ill., assignor to
G. D. Searle & Co., Chicago, Ill.
No Drawing. Filed Apr. 18, 1972, Ser. No. 245,253
Int. Cl. C07c 173/00
U.S. Cl. 260—239.55 D       10 Claims

ABSTRACT OF THE DISCLOSURE

Preparation of 6-alkyl-3-hydrocarbonaceous-16α,17α-dihydroxypregna-3,5-dien-20-one cyclic 16,17-acetals and 3-thienyl analogs thereof, together with their valuable anti-inflammatory properties, is disclosed.

---

This invention relates to 6-alkyl-3-hydrocarbonaceous-16α,17α-dihydroxypregna-3,5-dien - 20 - one cyclic 16,17-acetals and congeners, and to processes for the preparation thereof. More particularly, this invention relates to new, useful, and unobvious chemical compounds of the formula

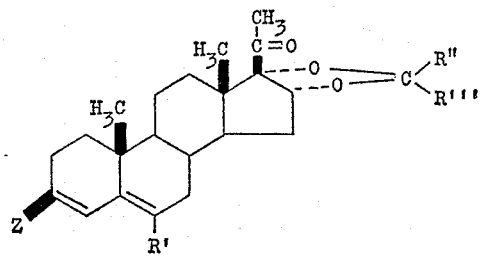

wherein Z represents alkyl, aralkyl such as benzyl and phenethyl, and phenyl optionally substituted by alkyl, halogen, alkoxy, or amino; R′ and R″ each represent alkyl; and R‴ represents hydrogen or alkyl. Z alternatively represents thienyl.

The alkyls contemplated by Z in the foregoing formula are preferably of lower order, i.e., methyl, ethyl, propyl, isopropyl, butyl, isobutyl, sec-butyl, tert-butyl, pentyl, neopentyl, hexyl, isohexyl, heptyl, or like monovalent, saturated, cyclic, straight- or branched-chain, hydrocarbon groupings of empirical formula $$-C_nH_{2n+1}$$

wherein $n$ represents a positive integer amounting to less than 8. The alkyls contemplated by R′, R″, and R‴ in the generic formula are preferably of lower order also, and most advantageously methyl.

Although there can be as many as 5 substituents, alike or different, in the phenyl moieties contemplated by Z, a single substituent (if any) is preferred, albeit its positioning with respect to the point of attachment to the steroid nucleus is not critical. Further, tolyl is a preferred alkyl-substituted phenyl moiety; and halophenyl in which the halogen has an atomic number less than 53 (viz, F, Cl, or Br) is likewise a preferred embodiment of Z, although 3-iodophenyls are of course within the purview of the invention. When Z represents phenyl substituted by alkoxy, the latter constituent is preferably of lower order, and thus can be enformulated lower alkyl 

Still further, when Z represents phenyl substituted by amino, the primary amino substitutent (—NH₂) is preferred; and when Z presents thienyl, both the 2-thienyl and 3-thienyl groupings serve.

The compounds to which this invention relates are useful by reason of their valuable biological properties. Thus, for example, they are anti-inflammatory agents.

The anti-inflammatory activity of the instant compounds is evident from the results of a standardized test for this property described in the paragraph beginning with line 34 in column 2 of U.S. 3,528,966.

Further evidence of the anti-inflammatory utility of the instant compounds is provided by the results of a standardized test for their capacity to inhibit the edema induced in rats by injection of carrageenin. The procedure is a modification of one described by Winter et al., Proc. Soc. Exp. Biol. Med., 111, 544 (1962). Compound is administered subcutaneously or intragastrically, dissolved or suspended in 0.5 ml. of aqueous 0.85% sodium chloride, propylene glycol, a mixture of these vehicles, or corn oil, to each of 10 male rats weighing 100–130 gm. A like group of rats to which is identically and concurrently administered vehicle alone serves as controls. Precisely 1 hour later, each animal is injected under the plantar surface of each hind foot with 0.1 ml. of an aqueous 1% solution of carrageenin (Marine Colloids, Inc., Type 402). A compound is considered anti-inflammatory if the average total volume of the two hind feet in the group treated therewith, which is measured in arbitrary units 5 hr. after the carrageenin injection, is significantly ($P \leq 0.05$) less than the corresponding value (C) for the control group.

Still further evidence of the anti-inflammatory utility of the instant compounds is provided by the results of a standardized test for their capacity to inhibit the edema induced in rats by injection of *Mycobacterium butyricum*. The procedure, which is similar to one described by Pearson et al. in Arthritis Rheumat., 2, 440 (1959), follows. Intact male Sprague-Dawley rats are randomized in groups of 12, one group for each compound to be tested plus one group to serve as controls. Each animal is injected intradermally (without any anesthesia) on the base of the tail with 0.6 mg. of dry heat-killed *Mycobacterium butyricum* (Difco 0640-33) suspended in 0.05 ml. of paraffin oil containing 2% digitonin, whereupon the prescribed dose of compound (initially 5 mg.), dissolved or suspended in a vehicle consisting of 0.2 ml. of either corn oil or a mixture of 20 ml. of aqueous 0.85 sodium chloride with 1 drop of polysorbate 80, is intragastrically or subcutaneously administered. Administration thus of compound is repeated daily for the next 18 consecutive days. The control group is identically and concurrently administered vehicle alone. On the 20th day, the rats are sacrificed and the total volume of each pair of hind feet is measured in arbitrary units. A compound is considered anti-inflammatory if the average volume (T) of the hind feet in the group treated therewith is significantly ($P \leq 0.05$) less then the corresponding value (C) for the control group.

The product of Example 1B hereinafter was found to be anti-inflammatory intragastrically at doses of 5, 5, and 1 mg., respectively, in the foregoing three standardized tests.

Those skilled in the art will recognize that observations of activity in standardized tests for particular biological effects are fundamental to the development of valuable new drugs, both veterinary and human.

Preparation of the subject compounds proceeds by heating a compound of the formula

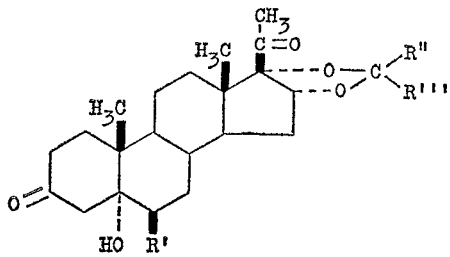

with aluminum oxide in benzene solution, filtering off the aluminum oxide, stripping the benzene from the filtrate, and successively contacting a solution of the residue in anhydrous diethyl ether with (1) a Grignard reagent of the formula ZMgBr and (2) methanolic hydrochloric acid. The residue referred to contains a compound of the formula

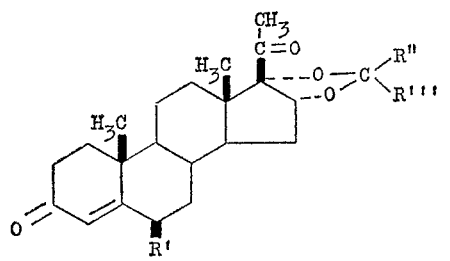

from which it follows that an alternative method of preparation consists of contacting such a compound in anhydrous diethyl ether with an appropriate Grignard reagent and methanolic hydrochloric acid as described above. Z, R', R", and R''' in the last three formulas retain the meanings previously set forth.

The following examples describe in detail compounds illustrative of the present invention and methods which have been devised for their preparation. It will be apparent to those skilled in the art that many modifications, both of materials and of methods, may be practiced without departing from the purpose and intent of this disclosure. Throughout the examples hereinafter set forth, temperatures are given in degrees Centigrade and relative amounts of materials in parts by weight, except as otherwise noted. Specific rotations refer to (a) the D line of sodium and (b) chloroform solutions at the indicated temperatures and concentrations.

EXAMPLE 1

(A) 16α,17α-dihydroxy-6β-methylpregn-4-ene - 3,20-dione cyclic 16,17-acetal with acetone.—A mixture of 10 parts of 5α,16α,17α-trihydroxy-6β-methylpregna - 3,20-dione 16,17-acetal with acetone, 53 parts of aluminum oxide, and 380 parts of benzene is heated at the boiling point under reflux for 4 hours, then cooled and filtered. The material removed by filtration is extracted with 200 parts of benzene, the extract is combined with the filtrate, and the resultant solution is stripped of solvent by vacuum distillation. The residue contains 16α,17α-dihydroxy-6β-methylpregn-4-ene - 3,20 - dione cyclic 16,17 - acetal with acetone.

(B) 16α,17α - dihydroxy-6-methyl-3-phenylpregna-3,5-diene-20-one cyclic 16,17-acetal with acetone.—A solution of 10 parts of the product of the foregoing part A in 230 parts of anhydrous diethyl ether is mixed with a solution of approximately 5 parts of phenylmagnesium bromide in 25 parts of diethyl ether. The resultant mixture is maintained at room temperature for 20 minutes, whereupon a solution of approximately 5 parts of concentrated hydrochloric acid in 110 parts of methanol, followed by 50 parts of water, is introduced. Organic solvents are removed by vacuum distillation; and the crystalline solids in the residual aqueous phase are separated by filtration, washed on the filter with water, dried in air, and recrystallized from a mixture of ethyl acetate and methanol to give 16α,17α-dihydroxy-6-methyl-3-phenylpregna-3,5-dien-20-one cyclic 16,17-acetal with acetone melting at 167–169° and having a specific rotation of —117.6° at 25° and a concentration of 1.020%. The product has the formula

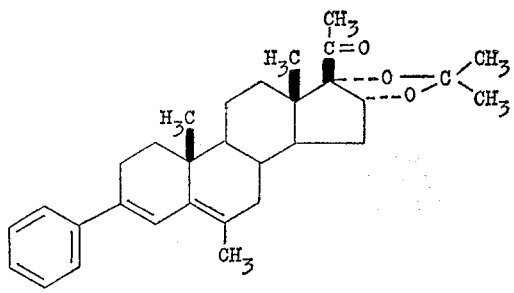

EXAMPLE 2

16α,17α - dihydroxy - 6 - methyl - 3 - (2 - thienyl) pregna - 3,5 - diene - 20 - one cyclic 16,17-acetal with acetone.—Substitution of 2-thienylmagnesium bromide for the phenylmagnesium bromide called for in Example 1(B) affords, by the procedure there detailed, 16α,17α-dihydroxy - 6 - methyl - 3 - (2-thienyl)pregna - 3,5 - dien-20-one cyclic 16,17-acetal with acetone melting at 238–241° and having a specific rotation of —124.3° at 28° and a concentration of 0.973%.

EXAMPLE 3

16α,17α - dihydroxy - 6 - methyl - 3 - (3 - thienyl) pregna - 3,5 - diene - 20 - one cyclic 16,17-acetal with acetone.—Substitution of 3-thienylmagnesium bromide for the phenylmagnesium bromide called for in Example 1(B) affords, by the procedure there detailed, 16α,17α-dihydroxy - 6 - methyl - 3 - (3 - thienyl)pregna-3,5-dien-20-one cyclic 16,17-acetal with acetone.

EXAMPLE 4

16α,17α - dihydroxy - 6 - methyl - 3 - (p - tolyl)pregna-3,5-dien-20-one cyclic 16,17-acetal with acetone.—Substitution of p-tolylmagnesium bromide for the phenylmagnesium bromide called for in Example 1(B) affords, by the procedure there detailed, 16α,17α-dihydroxy-6-methyl - 3 - (p-tolyl)pregna-3,5-dien-20-one cyclic 16,17-acetal with acetone melting at 207–212° and having a specific rotation of —116.1° at 29° and a concentration of 1.116%.

EXAMPLE 5

16α,17α - dihydroxy - 6 - methyl - 3(m - tolyl) pregna - 3,5 - dien - 20 - one cyclic 16,17-acetal with acetone.—Substitution of m-tolylmagnesium bromide for the phenyl-magnesium bromide called for in Example 1(B) affords, by the procedure there detailed, 16α,17α-dihydroxy-6-methyl-3-(m - tolyl)pregna-3,5-dien-20-one cyclic 16,17-acetal with acetone.

EXAMPLE 6

3 - (p - fluorophenyl) - 16α,17α - dihydroxy - 6 - methylpregna - 3,5 - dien - 20 - one cyclic 16,17-acetal with acetone.—Substitution of p-fluorophenylmagnesium bromide for the phenylmagnesium bromide called for in Example 1(B) affords, by the procedure there detailed, 3-(p-fluorophenyl)-16α,17α-dihydroxy - 6 - methylpregna-3,5-dien-20-one cyclic 16,17-acetal with acetone melting at approximately 225° and having a specific rotation of —65.1° at 26° and a concentration of 0.960%.

EXAMPLE 7

3 - (p - chlorophenyl) - 16α,17α - dihydroxy - 6 - methylpregna - 3,5 - dien-20-one cyclic 16,17-acetal with acetone.—Substitution of p-chlorophenylmagnesium bromide for the phenylmagnesium bromide called for in Example 1(B) affords, by the procedure there detailed, 3-(p-chlorophenyl) - 16α,17α - dihydroxy - 6 - methylpregna-3,5-dien-20-one cyclic 16,17-acetal with acetone melting at 225–228° and having a specific rotation of —102.9° at 27° and a concentration of 1.006%.

EXAMPLE 8

3-(m - bromophenyl) - 16α,17α - dihydroxy - 6 - methylpregna - 3,5 - dien-20-one cyclic 16,17-acetal with acetone.—Substitution of m-bromophenylmagnesium bromide for the phenylmagnesium bromide called for in Example 1(B) affords, by the procedure there detailed, 3-(m-bromophenyl) - 16α,17α - dihydroxy-6-methylpregna-3,5-dien-20-one cyclic 16,17-acetal with acetone.

EXAMPLE 9

16α,17α - dihydroxy - 3 - (p - methoxyphenyl)-6-methylpregna - 3,5 - dien-20-one cyclic 16,17-acteal with acetone.—Substitution of p-methoxyphenylmagnesium bromide for the phenylmagnesium bromide called for in Example 1(B) affords, by the procedure there detailed, 16α17α - dihydroxy - 3 - (p - methoxyphenyl) - 6 - methylpregna-3,5-dien-20-one cyclic 16,17-acetal with acetone melting at 185–189° and having a specific rotation of —115.6° at 29° and a concentration of 1.072%.

EXAMPLE 10

3 - (m - ethoxyphenyl)-16α,17α-dihydroxy-6-methylpregna-3,5-dien-20-one cyclic 16,17-acetal with acetone.—Substitution of m-ethoxyphenylmagnesium bromide for the phenylmagnesium bromide called for in Example 1(B) affords, by the procedure there detailed, 3-(m-ethoxyphenyl) -16α,17α - dihydroxy-6-methylpregna-3,5-dien-20-one cyclic 16,17-acetal with acetone.

EXAMPLE 11

16α,17α - dihydroxy - 3,6-dimethylpregna-3,5-dien-20-one cyclic 16,17-acetal with acetone.—Substitution of methylmagnesium bromide for the phenylmagnesium bromide called for in Example 1(B) affords, by the procedure there detailed, 16α,17α - dihydroxy - 3,6-dimethylpregna-3,5-dien-20-one cyclic 16,17-acetal with acetone melting at 171–175° and having a specific rotation of —113.0° at 28° and a concentration of 1.107%.

EXAMPLE 12

3 - ethyl - 16α,17α - dihydroxy - 6-methylpregna-3,5-dien-20-one cyclic 16,17-acetal with acetone.—Substitution of ethylmagnesium bromide for the phenylmagnesium bromide called for in Example 1(B) affords, by the procedure there detailed, 3-ethyl-16α,17α-dihydroxy-6-methylpregna-3,5-dien-20-one cyclic 16,17-acetal with acetone melting at 139–141° and having a specific rotation of —111.7° at 28° and a concentration of 1.025%.

What is claimed is:
1. A compound of the formula

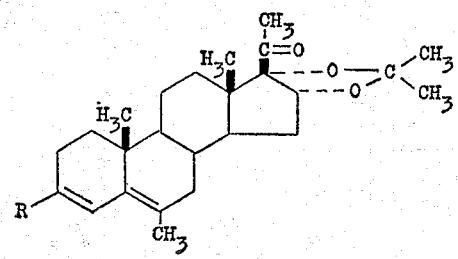

wherein R represents phenyl, thienyl, tolyl, or phenyl substituted by either halogen of atomic number less than 53 or lower alkoxy.

2. A compound according to claim 1 which is 16α,17α-dihydroxy - 6 - methyl - 3 - phenylpregna-3,5-dien-20-one cyclic 16,17-acetal with acetone.

3. A compound according to claim 1 having the formula

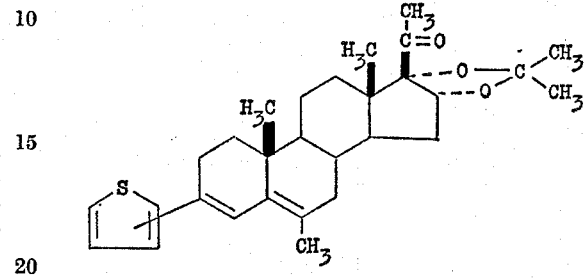

4. A compound according to claim 1 which is 16α,17α-dihydroxy - 6 - methyl-3-(2-thienyl)-pregna-3,5-dien-20-one cyclic 16,17-acetal with acetone.

5. A compound according to claim 1 having the formula

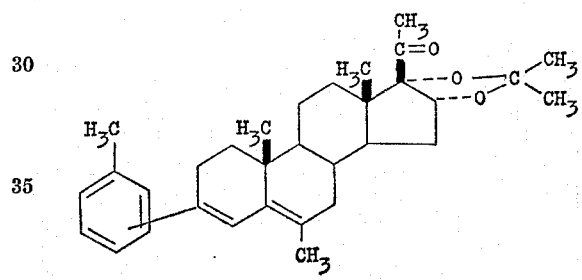

6. A compound according to claim 1 which is 16α,17α-dihydroxy - 6 - methyl-3-(p-tolyl)pregna-3,5-dien-20-one cyclic 16,17-acetal with acetone.

7. A compound according to claim 1 having the formula

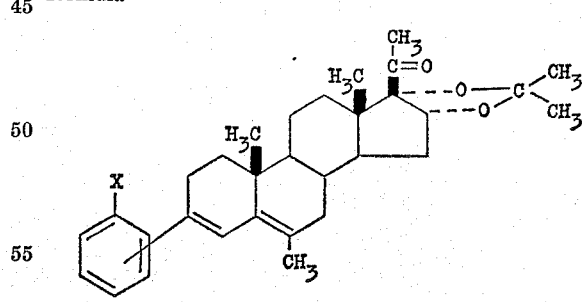

wherein X represents halogen of atomic number less than 53.

8. A compound according to claim 1 which is 3-(p-fluorophenyl) - 16α,17α - dihydroxy-6-methylpregna-3,5-dien-20-one cyclic 16,17-acetol with acetone.

9. A compound according to claim 1 having the formula

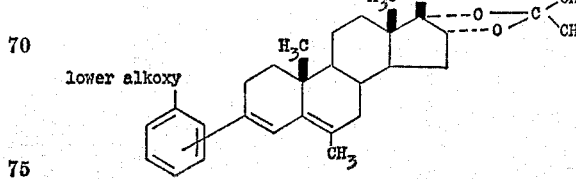

10. A compound according to claim 1 which is 16α,17α - dihydroxy - 3 - (p-methoxyphenyl)-6-methyl-pregna-3,5-dien-20-one cyclic 16,17-acetal with acetone.

References Cited

UNITED STATES PATENTS 3,099,657  7/1963  Zderic et al. _____ 260—239.55
3,349,085  10/1967  Fried _____ 260—239.55

HENRY A. FRENCH, Primary Examiner

U.S. Cl. X.R.

424—241